W. N. KELLY.
TRUCK.
APPLICATION FILED SEPT. 9, 1918.
1,303,480.
Patented May 13, 1919.
2 SHEETS—SHEET 1.
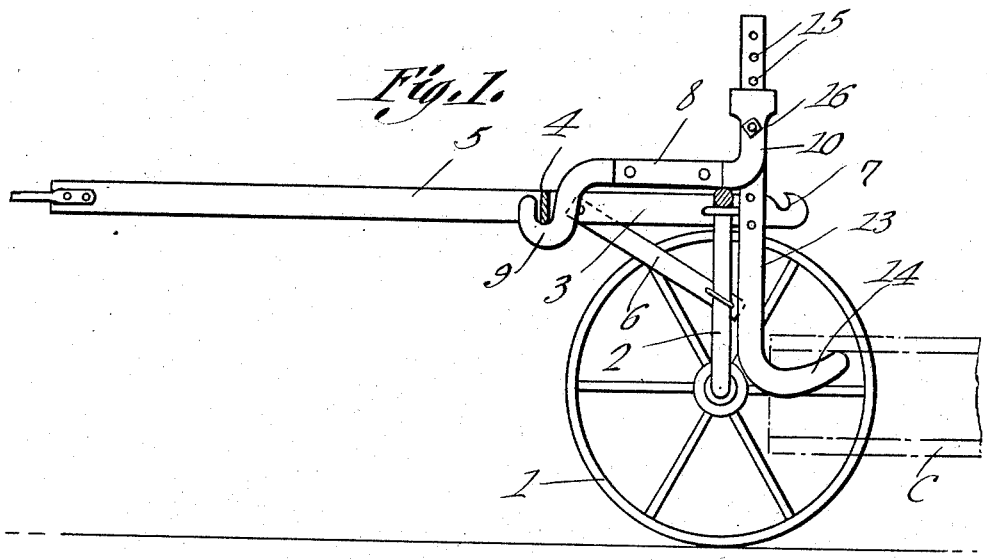
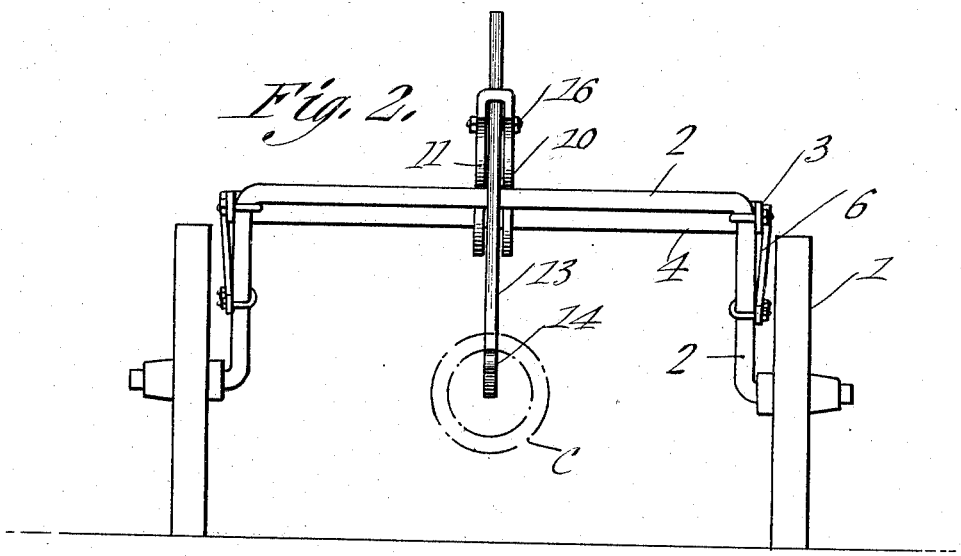
Witness
Inventor
W. N. Kelly
By C. A. Snow & Co.
Attorneys W. N. KELLY.
TRUCK.
APPLICATION FILED SEPT. 9, 1918.
1,303,480.
Patented May 13, 1919.
2 SHEETS—SHEET 2.
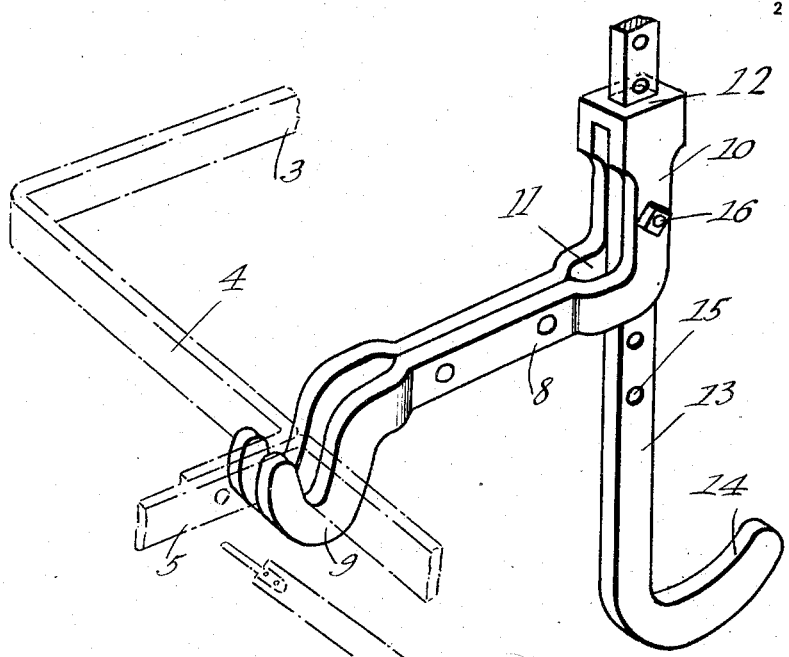
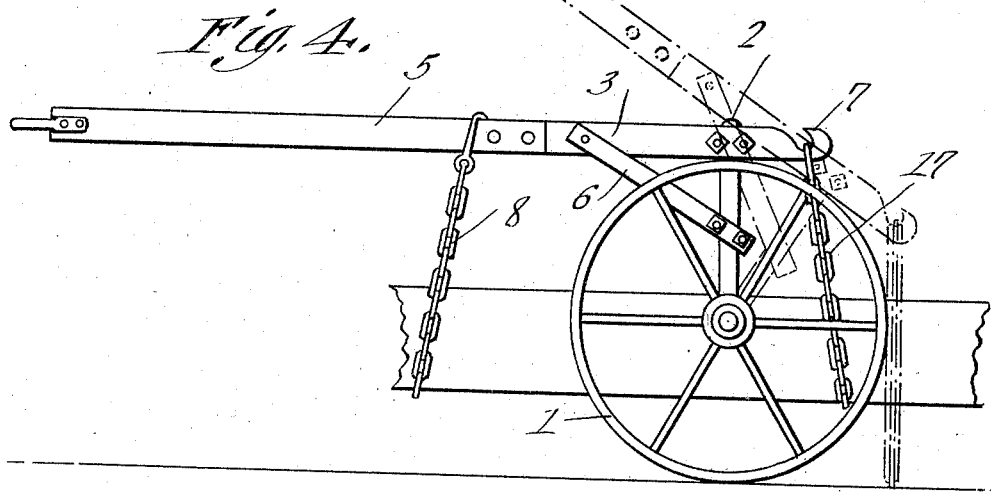

UNITED STATES PATENT OFFICE.

WILLIAM N. KELLY, OF MANNFORD, OKLAHOMA.

TRUCK.

1,303,480.

Specification of Letters Patent. Patented May 13, 1919.

Application filed September 9, 1918. Serial No. 253,225.

*To all whom it may concern:*

Be it known that I, WILLIAM N. KELLY, a citizen of the United States, residing at Mannford, in the county of Creek and State of Oklahoma, have invented a new and useful Truck, of which the following is a specification.

This invention relates to trucks particularly designed for use in transporting well casings and drills short distances, it being possible for one man to place the load upon the truck and to move it from place to place without any unusual effort.

Another object is to provide a truck which is simple and compact in construction and can be handled readily.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a central longitudinal section through the truck and showing the same arranged for use in supporting one end of a well casing, said casing being indicated by dotted lines.

Fig. 2 is a rear elevation of the device shown in Fig. 1.

Fig. 3 is a detail view of the casing supporting bracket used in connection with the truck.

Fig. 4 is a side elevation of the truck arranged for use in hauling a well drill.

Referring to the figures by characters of reference, 1 designates supporting wheels carrying an arched axle 2 to the upper portions of the sides of which are secured the sides of a yoke 3. The sides of the yokes are connected by a cross member 4 from which extends a tongue 5. Braces 6 are preferably connected to the sides of the arched axle and yoke to hold the axle against rotation relative to the yoke. The sides of the yoke 3 extend rearwardly beyond the axle and have hooks 7, as shown, for the purpose hereinafter set forth.

When it is desired to use the truck for supporting and conveying a well casing section two trucks such as described may be placed at each end thereof. One truck may be provided with a supporting member such as shown in detail in Fig. 3 and which includes a bar 8 having one end forked and hooked, as shown at 9 while its other end is extended upwardly, as shown at 10, and has a slot 11 extending therethrough. An opening 12 is formed in the upper end of the portion 10 and slidably mounted in this opening and in the slot 11 is a hanger 13 provided with a finger at its lower end, as shown at 14. Openings 15 are formed in the hanger and any one of them is adapted to receive a bolt 16 which extends transversely through the slotted portion 10 of the bar. The trucks are placed astride the ends of the casing section C and are tilted by lifting the tongues 5. The bar 8 is placed on the arched axle of one truck with its forked end 9 extended under the member 4 and straddling the tongue 5 (see Fig. 3). Hanger 13 will thus depend from the yoke 3 and the finger 14 can be inserted into one end of the casing C. A chain hanger or loop 17 is placed under the other end of the casing and its ends placed in engagement with the hooks 7 on the tilted yoke 3. By then pulling downwardly on the tongue 5 the chain 17 will be elevated and will lift the engaged end of the casing. Another chain 18 can be placed under the casing C at the other side of the axle 2 and attached to the tongue 5, thus to hold the truck against tilting and support the load off of the ground. This arrangement of parts has been shown in Fig. 4. By pulling downwardly on the tongue 5 of the truck having the hanger 13 said hanger will be elevated and the entire casing lifted from the ground.

Solid structures, such as drills, can be carried by placing at each end a truck such as shown in Fig. 4 or, if preferred, a single truck can be placed astride the central portion of the load and attached thereto by chains, as shown.

What is claimed is:—

1. A truck including a wheel supported arched axle, a yoke fixedly connected to the axle, a bar detachably supported on the axle and having a hooked end extending under and engaging the yoke, a hanger adjustably connected to the other end of the bar and extending downwardly below the axle, and a load engaging element upon the hanger.

2. A truck including a wheel supported arched axle, a yoke fixedly connected to the axle, a tongue extending therefrom, a bar detachably mounted on the axle and having a hooked forked end extending under the yoke and straddling the tongue, the other end of the bar being upturned and slotted, a hanger adjustably mounted in the slotted portion of the bar and extending below the axle, and a load engaging finger upon the hanger.

In testimony that I claim the foregoing as my own, I have hereto affixed my signature in the presence of two witnesses.

WILLIAM N. KELLY.

Witnesses:
W. C. CLIFFORD,
J. A. BROWN.

Copies of this patent may be obtained for five cents each, by addressing the "Commissioner of Patents, Washington, D. C."